United States Patent Office 3,334,071
Patented Aug. 1, 1967

3,334,071
POLYIMIDES FROM DIMALEIMIDES AND BISFULVENES
James A. Reeder, Vancouver, British Columbia, Canada, assignor to E. I. du Pont de Nemours and Company, Wilmington, Del., a corporation of Delaware
No Drawing. Filed Apr. 14, 1964, Ser. No. 359,770
4 Claims. (Cl. 260—78)

This invention relates to organic polymers, and more particularly, to organic polymers prepared by the Diels-Alder reaction.

The literature reports several attempts to polymerize by the Diels-Alder reaction. Such polymerizations have generally involved the reaction of double dienes, i.e., compounds containing two 1,3-diolefin groups in the same molecule, with active double dienophiles, such as quinone and dimaleimides. Although the Diels-Alder reaction is efficient and essentially quantitative, these attempts have generally failed to yield high molecular weight polymers.

An object of this invention is to provide a new class of organic polymers and a process for the preparation thereof. Another object is to provide a new class of high molecular weight organic polymers and a process for the preparation thereof by the Diels-Alder reaction.

These and other objects are attained by the present invention which provides the compound having the recurring structure:

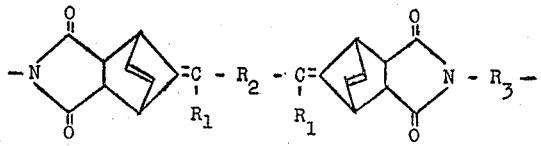

wherein each $R_1$ is a monovalent organic radical, preferably hydrogen or an alkyl radical, $R_2$ is an arylene radical, and $R_3$ is a divalent organic radical.

Such a compound is prepared by reacting a bisfulvene of the formula

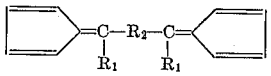

wherein $R_1$ and $R_2$ are radicals as defined above, with a dimaleimide of the formula

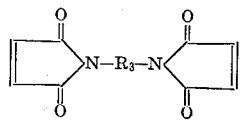

wherein $R_3$ is a radical as defined above. Following the general Diels-Alder reaction, the reaction of the present invention proceeds accordingly:

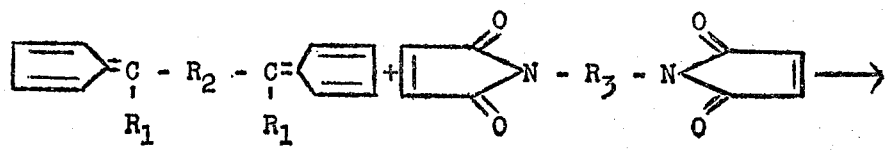

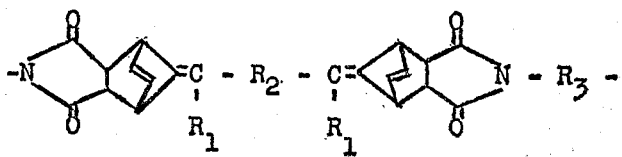

The bisfulvenes are conveniently prepared in high yield by the base-catalyzed condensation of cyclopentadiene with aromatic diketones, such as p-diacetylbenzene, 4,4'-oxydibenzophenone, m-diacetylbenzene, p-dipropionylbenzene, p-dibenzoylbenzene, p,p'-diacetyldiphenyl ether, p,p'-diacetyldiphenylmethane, p,p'-oxybis(phenyl cyclohexyl ketone), 2,6-diacetylnaphthalene, 9,10-dibenzoylanthracene, p,p'-bis(phenyl t-butyl ketone), p-phenylene bis(p-tolyl) ketone, and the like. These bisfulvenes are characterized by the general formula:

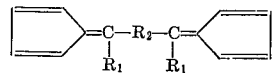

wherein each $R_1$ is a monovalent organic radical such as hydrogen, methyl, ethyl, propyl, butyl, isopropyl, sec.-butyl, tert.-butyl, 1-hexyl, 3-heptyl, cyclohexyl, cyclopentyl, phenyl, p-tolyl, m-tolyl, α-naphthyl, β-naphthyl, and the like, and $R_2$ is an arylene radical such as p-phenylene, m-phenylene, oxydi-p-phenylene, p,p'-disubstituted diphenylmethanes, 2,6-disubstituted naphthalenes, 9,10-disubstituted anthracene and the like. Suitable bisfulvenes include 6,6'-p-phenylene bis(6-methylfulvene), 6,6'-(oxydi-p-phenylene)bis(6-phenylfulvene), 6,6'-m-phenylene bis(6-methylfulvene), 6,6'-p-phenylene bis(6-ethylfulvene), 6,6'-p-phenylene bis(6-phenylfulvene), 6,6'-(oxydi-p-phenylene)bis(6-methylfulvene), 6,6'-(methylene di-p-phenylene)bis(6-methylfulvene, 6,6'-oxydi-p-phenylene)bis(6-cyclohexylfulvene), 6,6'-(2,6-naphthylene)bis(6-methylfulvene), 6,6'-(9,10-anthrylene)bis(6-phenylfulvene), 6,6'-p-phenylene bis(6-t-butylfulvene), 6,6'-p-phenylene bis(6-p-tolylfulvene), and the like.

The dimaleimides are conveniently prepared by the method disclosed in U.S. Patent 2,444,536, issued to N. E. Searle. These dimaleimides are characterized by the general formula:

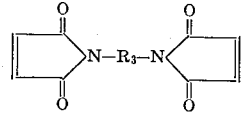

wherein $R_3$ is a divalent organic radical, such as ethylene, trimethylene, hexamethylene, p-phenylene, m-phenylene, oxydi-p-phenylene, p-xylylene, etc. Suitable dimaleimides include N,N'-m-phenylenedimaleimide, N,N'-hexamethylenedimaleimide, N,N'-(oxydi-p-phenylene)-dimaleimide, N,N'-ethylenedimaleimide, N,N'-trimethylenedimaleimide, N,N'-p-phenylenedimaleimide, N,N'-p-xylylenedimaleimide, and the like.

This reaction is conducted in a liquid which is a solvent for both the starting monomers and the resulting product, such as chloroform, dimethylformamide, diethylformamide, dimethylacetamide, methyl pyrrolidone, tetramethylene sulfone, etc.

The product of this reaction is a polymeric compound characterized by having the recurring structure:

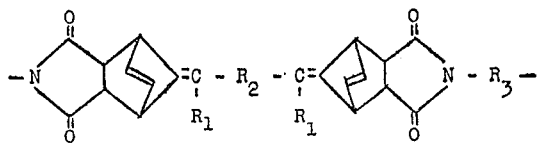

wherein $R_1$, $R_2$, and $R_3$ are organic radicals as identified above.

These compounds are high molecular weight polymers, usually having inherent viscosities of at least 0.45 as determined by the standard procedure, such as taught in Billmeyer, Textbook of Polymer Chemistry, Interscience Publishers, Inc., New York (1957), pp. 128–129.

The polymerization exhibits an interesting reversibility in solution. Thus, a sealed tube containing a concentrated solution of the monomer mixture gradually increases in viscosity at room temperature, and its color becomes lighter. After several days, it is completely rigid and very light in color. A few minutes of heating in a steam bath causes depolymerization with attendant darkening and loss of viscosity. Storage at room temperature again causes polymerization. This process may be repeated as many times as desired. Reversibility is also shown by the fact that dilute solutions gradually lose viscosity when stored.

These compounds form useful, strong, tough films. Concentrated solutions of these compounds are useful as adhesives in the manner familiar to those skilled in the art.

In the examples shown hereinafter, the following procedures were used to prepare the bisfulvenes used therein:

*Preparation of 6,6'-p-phenylene bis(6-methylfulvene)*

Sodium methoxide (10.8 g., 0.2 mole) was placed in a nitrogen-blanketed reaction flask and dissolved in 50 ml. of methanol. The solution was cooled to 35° and 13.2 g. (0.2 mole) of cyclopentadiene was added. (The cyclopentadiene had been freshly prepared by cracking dicyclopentadiene through a 40 cm. distilling column packed with glass helices. It distilled at 40–41° C.) The resulting solution was heated to reflux (46°). A separate solution of 8.1 g. (0.05 mole) of p-diacetylbenzene in 100 ml. of warm methanol was prepared. This solution was added dropwise through a heated dropping funnel while stirring the reaction mixture. After about 15 ml. had been added, a precipitate formed consisting of small orange platelets which increased in amount as the addition progressed. The entire addition took about two hours, during which the reaction temperature was maintained at 37–52°. Then the reaction mixture was stirred an additional ½ hour at 46–52° and cooled to 0°. The orange solid was removed by filtration, washed three times with 50 ml. portions of water, and dried under vacuum. The yield was 12.23 g. (95%), M.P. 161–5°. This was dissolved in 1400 ml. of hexane, filtered to remove a trace of insoluble material, and crystallized by storing overnight at −10°. A yield of 10.40 g. (80.6%) of large orange platelets was obtained, M.P. 163–6°. Two more recrystallizations gave 8.95 g. (69.5%) of M.P. 166–8°. The carbon-hydrogen content as calculated for $C_{20}H_{18}$ was: C, 92.99%; H, 7.01%, and as analyzed was: C, 93.19%; H, 7.06%.

*Preparation of 6,6'-(oxydi-p-phenylene)bis(6-phenylfulvene)*

Sodium methoxide (10.8 g., 0.2 mmole) was placed in a nitrogen-blanketed flask and dissolved in 50 ml. of methanol. The solution was cooled to room temperature, and 13.2 g. (0.2 mole) of cyclopentadiene was added. The resulting solution was heated to reflux (46°). A separate solution of 18.9 g. (0.05 mole) of 4,4'-oxydibenzophenone in a hot mixture of 150 ml. of benzene and 100 ml. of dimethylsulfoxide was prepared and cooled to 50° C. This solution was added rapidly to the reaction mixture, producing an immediate dark red color. The mixture was stirred 15 minutes at 50°, then cooled to 25° over a period of 1.5 hours, during which an orange solid separated from solution. The mixture was then cooled to 6° and filtered. The solid was washed five times with 50 ml. portions of methanol and dried under vacuum. The yield was 18.10 g. (81%) of orange crystalline powder, M.P. 155–7°. This was dissolved in a boiling mixture of 1500 ml. hexane and 300 ml. benzene, filtered hot to remove a trace of gelatinous brown sludge, and crystallized by storing overnight at −10°. A yield of 14.72 g. (65.8%) of orange crystalline powder was obtained, M.P. 156–8°. The carbon-hydrogen content as calculated for $C_{36}H_{26}O$ was: C, 91.11%; H, 5.52%, and as analyzed was: C, 90.90%; H, 5.60%.

The following examples are illustrative of this invention.

EXAMPLE 1

This example shows the reaction of 6,6'-p-phenylene bis(6-methylfulvene) with N,N'-m-phenylenedimaleimide in dimethylformamide. A 0.5166 g. (2.0 mmole) sample of 6,6'-p-phenylene bis(6-methylfulvene) and 0.5364 g. sample of m-phenylenedimaleimide were weighed out precisely and transferred quantitatively into a 1.5 x 23 cm. O.D. polymer tube with 5.00 ml. of dimethylformamide. The tube was cooled in a Dry Ice-isopropanol mixture, evacuated, and sealed. It was heated briefly to 60° C. to dissolve the solids, and most of the orange color disappeared. The tube was then stored at room temperature, and the solution gradually became more viscous. After 48 hours the solution was sufficiently viscous so that it took 20 seconds to move one inch when the tube was tilted. After 66 hours the solution was rigid and would not flow. The tube was opened and the solution was found to consist of a rubbery elastic gel. The gel was heated for five minutes on the steam bath, during which time it became a thick syrup with some elastic character. A 0.3659 g. sample of the syrup was diluted to 25 ml. with cold dimethylformamide for estimation of inherent viscosity (conc. =0.2547 g./100 ml.). The inherent viscosity at 30° was 0.82. The rest of the polymer was isolated by casting a film of about 0.002″ dry thickness. The film was light yellow, tough, and flexible.

EXAMPLE 2

This example shows the reaction of 6,6'-p-phenylene bis(6 - methylfulvene) with N,N' - m-phenylenedimaleimide in chloroform. A mixture of 0.5166 g. (2.0 mmole) of 6,6'-p-phenylene bis(6-methylfulvene), 0.5364 g. (2.0 mmole) of m-phenylenedimaleimide and 6.00 ml. of chloroform was sealed into a polymer tube as in the previous example. The tube was rocked slowly to effect complete solution of the solids, but not heated. The tube was stored for about 2½ days until the solution was very viscous but still flowable. It was then opened and a 0.5954 g. sample of the solution was diluted to 25 ml. with cold chloroform for estimation of inherent viscosity (conc.=0.2510 g. polymer/100 ml.). The inherent viscosity (taken about 24 hours later at 30°) was 1.14. The main portion of the concentrated polymer solution was poured into 200 ml. of vigorously stirred acetone, which caused the polymer to precipitate in long, tough, spongy strings. These were removed by filtration, and the excess solvent was removed by pressing between pads of filter paper. The polymer was redissolved in 20 ml. of chloroform and filtered by gravity filtration through a coarse sintered glass funnel. The polymer was then precipitated as fine white fibrids by pouring the solution into 200 ml. of vigorously stirred acetone, separated by filtration, and dried under vacuum. The yield was 0.88 g. (89%) of polymer as a nearly white fibrous powder. A 0.0600 g. sample of this powder was dissolved in 25 ml. of chloroform for estimation of inherent viscosity. The inherent viscosity of this solution at 30° was 1.00 immediately after preparation and 0.86 after standing 24 hours. The polymer could be redissolved in chloroform to form 10% solutions, from which strong, flexible, light yellow films were cast. Another sample of this polymer, prepared as above in chloroform, had an inherent viscosity of 1.47 as measured by dilution of the reaction mixture.

EXAMPLE 3

This example shows the reaction of 6,6'-p-phenylene bis(6 - methylfulvene) with N,N'-hexamethylenedimaleimide. A mixture of 0.5166 g. (2.0 mmole) of 6,6'-p-phenylenebis(6-methylfulvene), 0.5526 g. (2.0 mmole) of hexamethylenedimaleimide and 8.00 ml. of dimethylformamide was sealed into a polymer tube as in the previous examples. The tube was heated briefly in a 70° water bath to dissolve the solids, cooled to room temperature, and opened after 14 days. A 0.7189 g. sample of the solution was diluted to 25 ml. with dimethylformamide for estimation of the inherent viscosity (polymer conc. 0.3566 g./100 ml.). The inherent viscosity at 30° was 0.46. The polymer was isolated from solution by casting films and drying in a dry box containing $P_2O_5$. (This was necessary to prevent precipitation of the polymer by atmospheric moisture.) The films were soluble in chloroform. The inherent viscosity of the redissolved polymer in chloroform (0.2512 g./100 ml. at 30°) was 1.01.

EXAMPLE 4

This example shows the reaction of 6,6'-p-phenylene bis(6 - methylfulvene) with N,N'-(oxydi-p-phenylene) dimaleimide. A mixture of 0.5166 g. (2.0 mmole) of 6,6' - p - phenylenebis(6-methylfulvene), 0.7207 g. (2.0 mmole) of the dimaleimide and 6.00 ml. of dimethylformamide was transferred quantitatively into a polymer tube. A rubber cap was put over the tube opening, but the tube was not sealed. It was heated briefly at 70° to effect solution of the solids, and then stored at room temperature. After 24 hours the solution was very viscous, and it was then stored overnight at about −10°. A 0.5012 g. sample of the solution was diluted to 25 ml. with dimethylformamide (conc. 0.3593 g./100 ml.). The inherent viscosity of this solution at 30° was 0.62. The concentrated polymer solution was stored for an additional two days at room temperature. One gram of this solution was diluted with an equal weight of dimethylformamide. A film was cast from this solution and dried in a dry box containing $P_2O_5$. The film was extensively flawed owing to the presence of gel particles, but it appeared qualitatively to be tough and flexible.

EXAMPLE 5

This example shows the reaction of 6,6'-(oxydi-p-phenylene)bis(6-phenylfulvene) with N,N'-m-phenylenedimaleimide. A mixture of 0.9491 g. (2.0 mmole) of 6,6'-(oxydi-p-phenylene)bis(6-phenylfulvene), 0.5364 g. (2.0 mmole) of m-phenylene dimaleimide and 5.0 ml. of dimethylformamide was sealed into a polymer tube as in the previous examples. The tube was heated briefly to dissolve the solids and stored at room temperature. After about 4½ days the viscosity had increased so that the solution took about ten seconds to move one inch when the tube was tilted. After eight days the viscosity was very high and the solution took more than 60 seconds to flow one inch. The tube was heated for 15 minutes in the steam bath to reduce viscosity, and opened after four hours at room temperature. The polymer solution was light orange in color. A 0.2911 g. sample of the solution was diluted to 25 ml. with dimethylformamide (conc. of polymer 0.2866 g./100 ml.). The inherent viscosity of the solution at 30° was 0.46. The polymer was isolated by casting films of about 0.002" dry thickness. The clear yellow films were very tough and flexible. A sample of film was dissolved in chloroform to give an inherent viscosity (0.2832 g./100 ml. at 30°) of 0.45.

I claim:
1. A compound consisting essentially of recurring units of the general formula

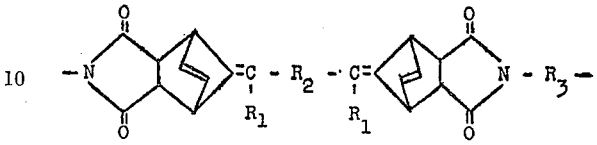

wherein each $R_1$ is hydrogen or a monovalent hydrocarbon radical, $R_2$ is a divalent aromatic carbocyclic radical, and $R_3$ is a divalent aliphatic or carbocyclic aromatic radical.

2. The process for preparing a polymer comprising reacting, in the liquid phase, a bisfulvene of the formula

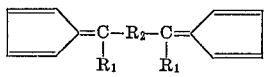

wherein each $R_1$ is a monovalent organic radical, and $R_2$ is a divalent aromatic carbocyclic radical, with a dimaleimide of the formula:

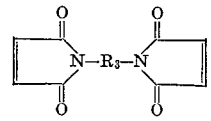

wherein $R_3$ is a divalent aliphatic or carbocyclic aromatic radical.

3. The process for preparing a compound having the recurring structure:

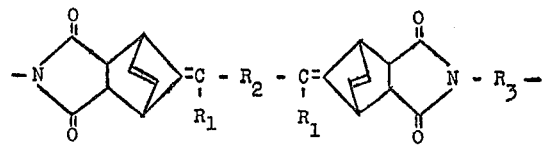

comprising reacting in a liquid a bisfulvene of the formula

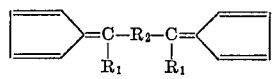

with a dimaleimide of the formula

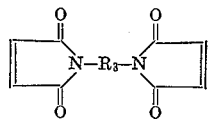

wherein each $R_1$ is alkyl, $R_2$ is arylene or oxydiarylene and $R_3$ is alkylene, arylene or oxydiarylene, said liquid being a solvent for said compound, said bisfulvene and said dimaleimide.

4. A compound according to claim 1 wherein $R_1$ is alkyl, $R_2$ is arylene or oxydiarylene, and $R_3$ is alkylene, arylene or oxydiarylene.

References Cited
UNITED STATES PATENTS

| | | | |
|---|---|---|---|
| 2,971,944 | 2/1961 | Chow et al. | 260—78 |
| 3,074,915 | 1/1963 | Chow | 260—78 |
| 3,097,189 | 7/1963 | Baum | 260—78 |

WILLIAM H. SHORT, *Primary Examiner.*

H. D. ANDERSON, *Assistant Examiner.*